US008387124B2

(12) United States Patent
Smetters et al.

(10) Patent No.: US 8,387,124 B2
(45) Date of Patent: Feb. 26, 2013

(54) WORMHOLE DEVICES FOR USABLE SECURE ACCESS TO REMOTE RESOURCE

(75) Inventors: Diana K. Smetters, Belmont, CA (US); Trevor F. Smith, Seattle, WA (US); Kyung-Hee Lee, Kyeonggi-Do (KR)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1156 days.

(21) Appl. No.: 11/744,451

(22) Filed: May 4, 2007

(65) Prior Publication Data

US 2008/0229402 A1 Sep. 18, 2008

Related U.S. Application Data

(60) Provisional application No. 60/895,115, filed on Mar. 15, 2007.

(51) Int. Cl.
*H04L 29/06* (2006.01)
(52) U.S. Cl. ............. 726/9; 726/2; 726/3; 726/4; 726/5; 726/6; 726/7; 726/26; 726/27; 726/29; 726/30; 713/165; 713/167; 713/182; 713/184; 713/185; 713/186; 709/217; 709/218; 709/219; 709/225; 709/226; 709/227; 709/228; 709/229
(58) Field of Classification Search .................. 726/2–5, 726/9, 26–30; 713/164–167, 182–186; 235/375, 235/379–382; 709/217–219, 223–229
See application file for complete search history.

(56) References Cited

U.S. PATENT DOCUMENTS

| 5,870,468 | A * | 2/1999 | Harrison ...................... 713/165 |
| 6,397,261 | B1 | 5/2002 | Eldridge et al. |
| 6,601,102 | B2 | 7/2003 | Eldridge et al. |
| 6,971,017 | B2 | 11/2005 | Stringer et al. |
| 7,080,154 | B1 * | 7/2006 | Inoue et al. ................... 709/234 |
| 8,108,869 | B2 * | 1/2012 | Jackson ........................ 718/104 |
| 2003/0149874 | A1 | 8/2003 | Balfanz et al. |
| 2007/0156850 | A1 * | 7/2007 | Corrion ......................... 709/219 |
| 2007/0234404 | A1 * | 10/2007 | Bogdanovic et al. ............. 726/3 |
| 2007/0280509 | A1 * | 12/2007 | Owen et al. ................... 382/115 |

OTHER PUBLICATIONS

Ayatsuka, Y., and Rekimoto, J., "transticks: Physically Manipulatable Virtual Connections," *CHI '05: Proceedings of the SIGCHI Conference on Human Factors in Computing Systems*, pp. 251-260, New York, NY, USA, 2005. ACM Press.
Balfanz, Dirk; Smetters, Diana K.; Stewart, Paul; and Wong, H. Chi; "Talking to Strangers: Authentication in Ad-hoc Wireless Networks," *Proceedings of the 2002 Network and Distributed Systems Security Symposium* (NDSS '02), San Diego, CA, Feb. 2002. The Internet Society (13 pages).

(Continued)

*Primary Examiner* — Thanhnga B Truong
*Assistant Examiner* — Madhuri Herzog
(74) *Attorney, Agent, or Firm* — Marger Johnson & McCollom, PC

(57) ABSTRACT

A token has a memory, an interface allow connection to a host, and a processor. The processor, in response to user input for configuring a remote access connection, executes a first set of processing instructions to establish a trusted connection with the server host, exchanges credentials over the trusted connection to establish a secure connection with the server host over an untrusted connection, and defines configuration information for accessing user selected data or services. The processor, in response to user input received in a legacy environment, executes a second set of processing instructions that includes establishing, over an untrusted connection, a secure connection with the server host using the security credentials, configuring the secure connection for access to the data or services, making the data or services available in the legacy environment, and defends against attempted access to data or services available at the token other than the data or services made available in the legacy environment.

25 Claims, 7 Drawing Sheets

OTHER PUBLICATIONS

Blaze, Feigenbaum and Naor, "A Formal Treatment of Remotely Keyed Encryption," *EUROCRYPT: Advances in Cryptology: Proceedings of EUROCRYPT*, 1998 (22 pages).

Blaze, M., "High-Bandwidth Encryption with Low-Bandwidth Smartcards," *Proceedings of the Fast Software Encryption Workshop*, No. 1039 in Lecture Notes in Computer Science, pp. 33-40, Springer-Verlag, 1996.

Juels, Ari; Wattenberg, Martin; "A Fuzzy Commitment Scheme," *ACM Conference on Computer and Communications Security*, pp. 28-36, 1999.

Lamming, M.; Eldridge, M.; Flynn, M.; Jones, C.; and Pendlebury, D.; "Satchel: Providing Access to Any Document, Any Time, Anywhere," *ACM Transactions on Computer-Human Interaction*, 7(3):322-352, 2000 (31 pages).

Oprea, A.; Balfanz, D.; Durfee, G.; and Smetters, D.K.; "Securing a Remote Terminal Application with a Mobile Trusted Device," *Proceedings of the Annual Computer Security Applications Conference*, Tucson, AZ, Dec. 2004.

Pering, Trevor; Nguyen, David H.; Light, John; Want, Roy; "Face-to-Face Media Sharing Using Wireless Mobile Devices"; *Seventh IEEE International Symposium on Multimedia (ISM '05)*, pp. 269-276, 2005.

Smetters, D.K.; Balfanz, D.; Durfee, Glenn; Smith, Trevor F.; and Lee, Kyung-Hee; "Instant Matchmaking: Simple and Secure Integrated Ubiquitous Computing Environments," *Proceedings of UBICOMP* 2007.

Want, Roy; Pering, Trevor; Danneels, Gunner; Kumar, Muthu; Sundar, Marali; and Light, John; "The Personal Server: Changing the Way We Think about Ubiquitous Computing," *Ubicomp*, pp. 194-209, 2002.

\* cited by examiner

WORMHOLE DEVICES FOR USABLE SECURE ACCESS TO REMOTE RESOURCE

RELATED APPLICATIONS

This application is a continuation of, and claims priority to, U.S. Provisional Patent Application Ser. No. 60/895,115 filed Mar. 15, 2007.

BACKGROUND

As users rely more and more on remote connections to access resources, such as devices, services, and data, security concerns increase accordingly. To increase access to resources regardless of security, the resource must have easy access and high usability. Reducing the amount of effort required to access the resource will fundamentally change how and when people use the resource. The usability barrier should be below a level of effort users are willing to give to get access to the resource. The users should think of the resource as the preferable and easier alternative to other resources.

When security joins into the interaction, the usability barrier typically rises. In order to maintain security on the user's device or devices, the security mechanisms and techniques should remain easy and simple to use. If the security becomes too difficult or inconvenient to use, users will either reduce the level of security or eliminate it completely. This leaves the resource and the user's device open to malware attacks.

By providing devices and methods that have easy access to resources and strong, but easy to use, security, the security may actually improve. Usable security measures make users far more likely to leave the security measures in place, rather than disabling them for ease of use.

BRIEF DESCRIPTION OF THE DRAWINGS

Embodiments of the invention may be best understood by reading the disclosure with reference to the drawings, wherein.

DETAILED DESCRIPTION OF THE EMBODIMENTS

Figure 1:
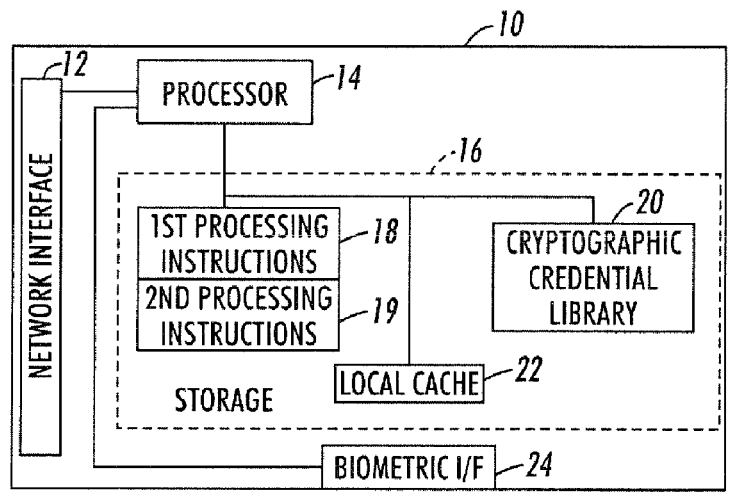
FIG. 1 shows an embodiment of a wormhole token.

FIG. 1 shows on example of a 'wormhole' device or token capable of establishing a secure connection to some other entity on a network in a manner transparent to the user. A 'wormhole' as used here consists of a secure connection between a location and any other entity on the network, similar to a secure tunnel or VPN, except that the device makes connection through several different wormholes as needed, depending upon the situation in which the wormhole is activated.

Wormhole devices may consist of standalone hardware devices that may take many forms, such as a USB 'thumb' or flash drive, a peripheral component interconnect (PCI) card, etc. The wormhole devices will connect to and communicate with several other devices, including other wormhole devices. Therefore, for ease of understanding and differentiation, the wormhole devices will be referred to as wormhole tokens, or just as tokens. Tokens may also consist of software being executed by a host device that provides the wormhole functionality for the host device.

The wormhole token 10 of FIG. 1 has a processor 14 and a network interface 12. The network interface, as will be discussed in more detail further, may be an interface to a host device that allows the token to use the host's network interface, or may be an independent network interface. The wormhole token 10 also has a storage 16 that stores a first set of processing instructions 18 that allows the token to setup connections, and a second set of processing instructions 19 that allows the token to operate in accordance with one or another application. The storage also has security credentials 20.

The security credentials may take many forms and generally allow the establishment of a secure connection between the token and a resource entity on the network, such as the Internet. Credentials may include, and are not limited to, public keys, private keys, public-key certificates, cryptographic hashes of public keys, cryptographic hashes of public-key certificates, tokens, symmetric keys or secrets, and cryptographic hashes of tokens.

In addition, depending upon the implementation and the desired behavior of the token, the storage 16 may also include a local cache 22 for data received across the network from resources. The local cache is optional. Similarly, the wormhole token may also include a biometric interface 21 to increase security of the token, but that is optional as well. The biometric interface may consist of a fingerprint scanner and recognition software, such as using the control buttons of a media player as a fingerprint scanner. Many alternatives exist, including a voice authenticator, allowing the wormhole token to lock down unless activated by the appropriate user's voice or fingerprint.

Generally, the burden of establishing secure connections and maintaining secure data falls on the task of configuration of the wormhole token. However, even though configuration of the token will carry that responsibility, the configuration interface should remain as user-friendly as possible to increase the likelihood of proper configuration and usability of the security measures. An example of a method of configuring a wormhole token is shown in FIG. 2.

Figure 2:
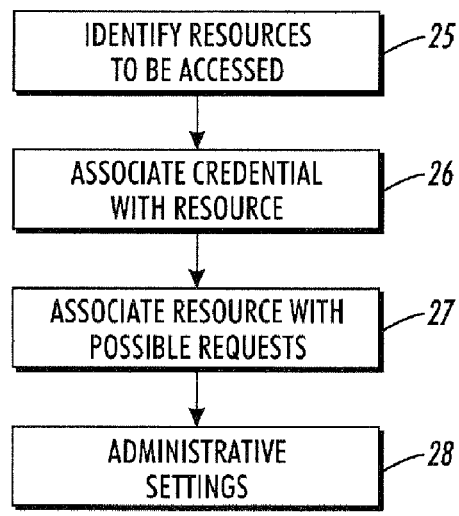
FIG. 2 shows an embodiment of a method of configuring a wormhole token.

In FIG. 2, the wormhole token receives list of resources to be accessed at 25 for a particular type of wormhole token, as will be discussed in more detail further. Each resource has a security credential associated with it at 26. For example, if the resource availability depends upon a subscription, the subscription identifier, such as a user name and password, must be associated with the resource. In addition, any security credential exchanges needed to identify the wormhole token to the resource are associated with the resource in the wormhole token.

At 27, the resources are associated with possible user requests. As will be discussed in more detail later, a user interface may provide the user with selections of various types of media. The user's selection of 'music' as the type of media may cause the wormhole to access a subscription music service, such as iTunes®, or Rhapsody®, etc. In addition to these associations, administrative settings for such things as logging and feedback options are defined at 28.

Generally, the separation of configuration and use distinguish the wormhole tokens from other work on accessing remote resources. The wormhole token configuration can be viewed as having three components. Device configuration, such as that discussed above, requires giving the token proper credentials to access a resource, providing a list of identified resources and associated requests from the user that will result in access of those resources, and the nature of any administrative tasks. The resource configuration addresses the use of trusted resources by the wormhole token. The resource, or proxy, should have some notice of the intended accesses, authentication measures, and what safeguards to maintain. Finally, a reconfiguration component exists, which must be user-friendly, for adding and removing resources, repurposing the wormhole token for other uses, etc. The desired end result would have the user just 'plug and play' the token and have it work seamlessly.

Figure 3:
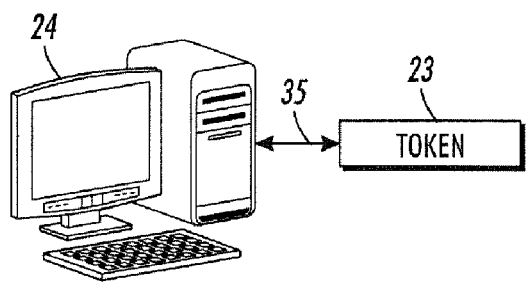
FIG. 3 shows an embodiment of an environment for configuring a wormhole token.

FIG. 3 shows an example of an environment in which a wormhole token would be set up or configured. The token 23, which may take many forms, including a media player or a storage token similar to a USB 'thumb' drive, is connected through a trusted connection 33 to a server host 24. The server host is a trusted device that will be used to configure the token, and may also directly provide the protected resources that the token will be used to access.

A trusted connection is established between the server host and the token, to allow for secure configuration, for example by physically connecting the token to the server host. A host is identified as a trusted server host to the token through the use of special configuration software, its status as the first host a new or re-initialized token is connected to, and/or the entry by the user of additional authentication information used to inform the token that it should allow itself to be configured or reconfigured by this host. A client host is any device to which the token may be attached during operation; client devices are typically, but not necessarily, untrusted.

The trusted connection may be a direct physical connection, as when a USB 'thumb' drive is inserted physically into a host computer. It may also be a secure network connection authenticated in a trusted fashion, such as by the exchange of public key information over a physically-limited channel such as physical cable, contact, InfraRed, as in US Patent Application Publication 20030149874, or by direct user confirmation that the public keys used to authenticate the connection indeed belong to the correct endpoints, such as by comparing numerical, textual, aural or visible representations of those public keys. The token may have the setup and operating processing instruction sets, the security credential and other configuration information, or the token may receive security credentials and configuration as part of this connection.

The credential may also have pre-existing credentials and configuration information that it may also use, such as a long-term key pair used repeatedly by the token throughout its life. The server host 24 has data related to whichever resources the token desires access and its own security credential. There may be a user interface component that allows the user to specify additional credential or configuration information as part of the setup, in addition to selecting the set of resources, such as user selected data or services, which the token should be able to later access. It may also provide, from the token, or activate preexisting software on the server host that enables the later access to content via the token, similar to a server process that starts running listening for future connections from the token. This environment allows the token to be setup for use.

Figure 4:
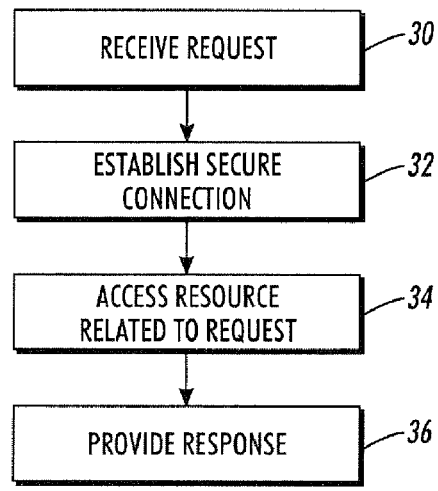
FIG. 4 shows an embodiment of a method of using a wormhole token.

FIG. 4 shows an example of a method of using a wormhole token. At 30, the token receives a request typically from the user, either over its own included user interface as in the media wormhole, or from the client, such as selection of a media file to play in a media player program, or selection of a file to copy in a file browser, or some other task such as establishing a physical or logical connection. The token establishes a secure connection with the appropriate resource at 32. At 34, the token accesses the resource, including any data on the resource needed to fulfill the request. Finally, at 36, a response is provided to the user or requesting device.

Figure 5:
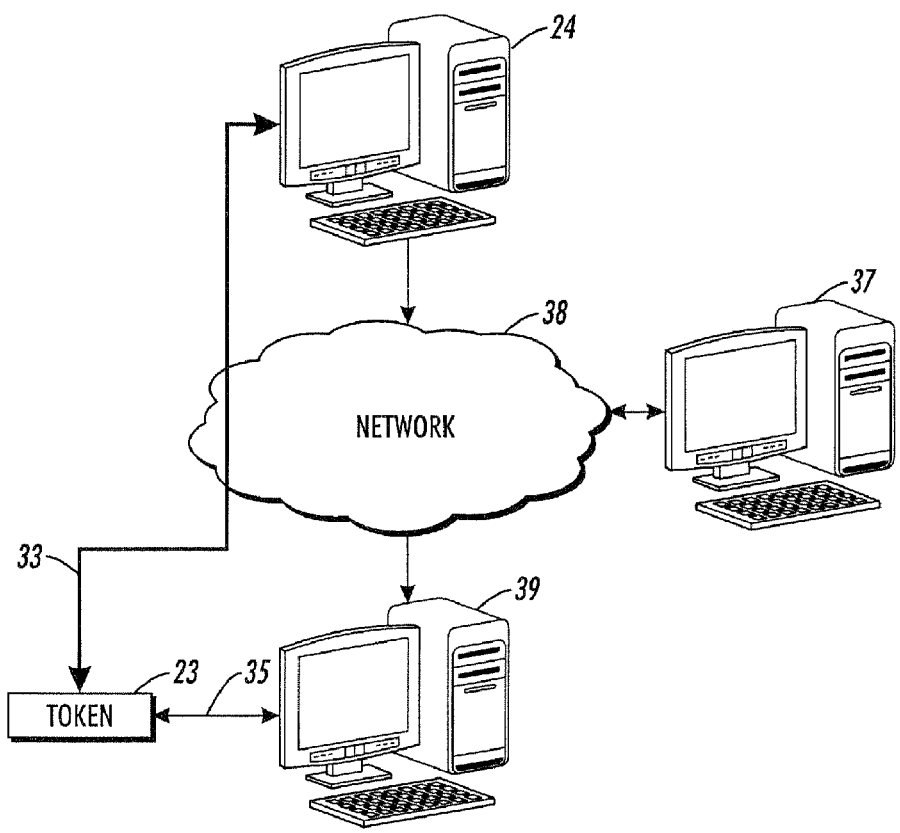
FIG. 5 shows an embodiment of an environment for using a wormhole token.
Figure 6:
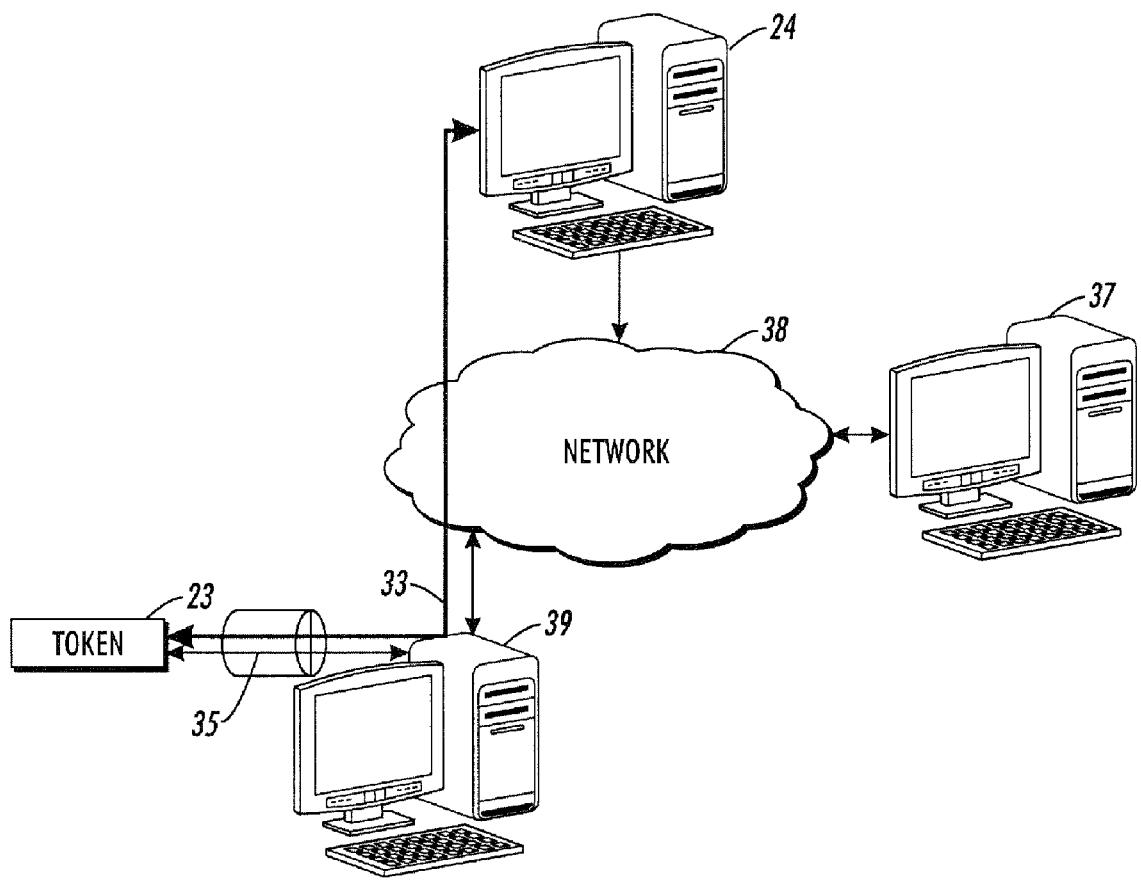
FIG. 6 shows an alternative embodiment of an environment for using a wormhole token.

In using the wormhole token with a client, different types of relationships may exist between the token and the client. FIGS. 5 and 6 show alternative embodiments of environments in which the wormhole token may be used. In FIG. 5, the token 23 has an untrusted connection 33 with the client host 39. The token uses its own network interface card (NIC) to access the network 38 and provide a trusted connection 33 with the server host 24, as well as connection to other devices such as 37. The environment between the token and the client host 39 may be referred to as being a 'legacy environment.'

A 'legacy environment,' as that term is used here, means a computational operating environment with interfaces, protocols and standards for receiving and processing user input defining a coupling action to establish a connection between the token and the host, or an input action at a user interface issuing a command to a legacy environment. In the example of FIG. 5, where the token is a media player, the token may have a user interface for access to the legacy environment to control media data downloaded through the network 38. In the media player example, the client host may be a device upon which the token can play the media data. The user input would occur at the user interface of the token to cause the token to issue a command.

In the example of FIG. 5, where the token is a storage token, similar to a USB 'thumb' drive, the legacy environment operates between the token and the client host 39, and specifies both the physical and electrical form of the USB connection between the token and client, as well as the standard protocol that operates between them, which lets the unmodified client understand that the token represents a USB 'thumb' drive, as well as potentially other devices, and that it should speak to it over the USB connection using the standard protocols and interfaces used to communicate with such devices, such as to list the contents of the directories they contain, or to retrieve the data contained within a particular file. The client host may also include a user interface for access to the legacy environment between the client host and the token. In the case of a storage application, the user interface may be used to specify which files the user wishes to access. The user input may be coupling the storage token with a client host.

FIG. 6 shows an alternative environment, where the token 23 has an untrusted connection 35 between the token 23 and the host 39, but uses the client host connection to access the network to establish the trusted connection 33 with the server host 24. The legacy environment still exists between the token and the client host. Depending upon the application of the token, such as a media player or a storage token among others, the user interfaces mentioned above would provide access to the legacy environment either via an interface presented on the client host, or via an input and/or output interface presented directly on the token itself if it has the capability to do so.

Figure 7:
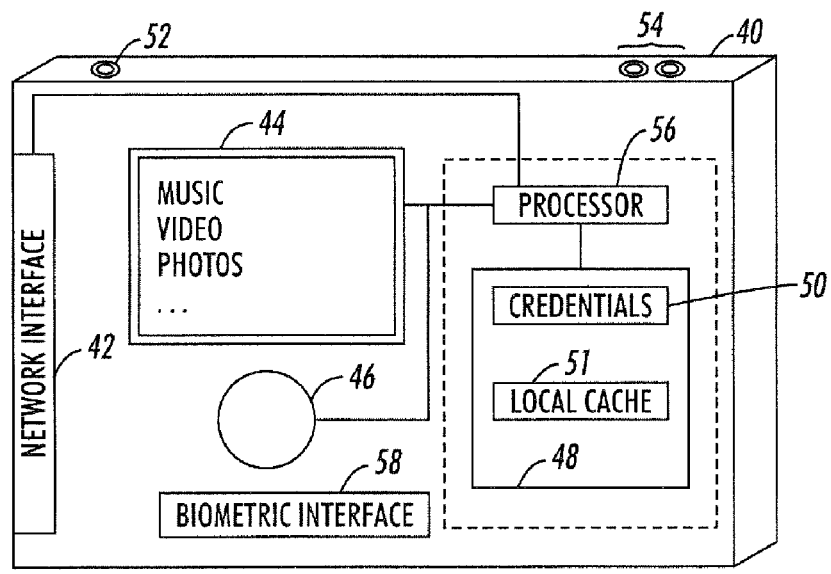
FIG. 7 shows an embodiment of a wormhole media player.

FIG. 7 shows one example of a more detailed view of the media player wormhole token. The media player would have local playback capability for audio and video, such as a screen and headphones. It may also have connections to legacy audio and video devices that allow the media player to send media output signals to those devices. To the user, media would appear as if stored locally on the device, but would actually exist on a resource on the network.

The medial player 40 has a network interface 42, such as a wireless interface in accordance with IEEE 802.11x (802.11a/b/g/n), a wide-area or metropolitan-area wireless interface such as a cellular data interface such as EDGE, GPRS, UMTS, HSCSD, or a wide-area wireless interface such as WiMAX (IEEE 802.16), a Bluetooth interface, an infrared interface, an interface in accordance with IEEE 1394 (Firewire) an Ethernet interface, or some other local area or wide area network interface. The network interface may connect the player with a local hub or access point, or may connect the player with a wide area network or the Internet directly.

The player has its own processor, 56, internal to the housing as indicated by the dashed box, and a storage 48 having the appropriate security credentials and processing instructions 50 and an optional local cache 51. The local cache would allow the player to store media selections, but this is optional. It may be desirable that the player not have a local cache for management of copyright issues.

The player has a user interface, such as the screen 44, in conjunction with the control button or knob 46, or not. The control button could instead be a 'soft' button on the display 44. The screen 44 shows a list of examples of types of media only as an example. In the example of FIG. 7, the media output from the player would come from a pair of headphones, not shown, attached to an audio output jack 52 on the side of the player. In addition, connection 54 to legacy devices allows the player to play the media output on the legacy devices. Legacy devices may include a stereo, an external display, a television, and an external speaker. In addition, the connection 54 may allow connection to other external devices such as a personal computer. The player may also include the biometric interface 58.

Figure 8:
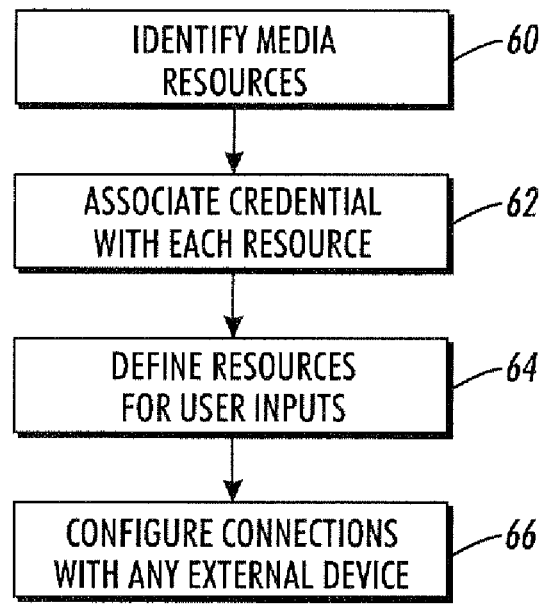
FIG. 8 shows an embodiment of a method of configuring a wormhole media player.

FIG. 8 shows an example of a method of configuring the media player to allow the various capabilities to be used. At 60, the configuring user identifies media resources depending upon the capabilities of the player and the desired output. At 62, the appropriate credentials are associated with the various resources to allow seamless, transparent user access to the resources.

The level of credentialing needed, as well as various other parameters such as authentication levels, may be defined for each resource at this point. The goal is to protect the wormhole token, the resources and the host from attack. Several techniques may protect the token from attack. For example, a protected operating system can lock down what applications can do that are provided by the token. Encryption and authentication of all the connections, between the wormhole token, host device and pre-configured, trusted or semi-trusted remote resources, and firewalling of all other traffic protects the token from eavesdropping and identity usurping by imposters. Further, the wormhole token could encrypt its local data store containing resource data, credentials and configuration data while at rest, and then require a user authentication to become active.

Resources receive protection by involvement of the wormhole token itself. By requiring tight coupling of the access to the resource and the presence of the wormhole token, access to the resource without the wormhole token would be forbidden. Further, it may be possible to gather information about user intent and ensure that grants of access are tightly coupled with user intent.

Threats to resources from arbitrary devices can be avoided by requiring authenticated and secured connections between the wormhole token, the trusted resources and the local device being granted access. Coupling this with the device's own defenses of the credentials helps to ensure direct involvement of the wormhole token in any exchange of data. Definition of a level of authentication may also ensure at least a partial involvement of the wormhole token. Authentication of the wormhole token may suffice for some applications. Other cases, intermittent authentication of the user in conjunction with the device may suffice. In higher security cases, authentication of the user may be needed, but may be accomplished using the biometric interface unobtrusively.

The target host constitutes another possible threat. The client device to which the wormhole token attaches may pose a threat because of unwanted access. In the case of a media player, the media player may have a connection to a legacy output device such as a stereo. The user may wish to play selection media on the stereo. By limiting the interface between the media player and the stereo, it reduces the risk to the player. In the case of a storage token, the untrusted client that the token is connected to may attempt to retrieve additional files from the resources provided by the token, beyond those specified by the user through the legacy user interface, and without the user's knowledge.

Other approaches include ensuring the active participation of the trusted wormhole token in accesses, discussed above, throttling the number of requests the host can make to the device during a predetermined period of time, thereby limiting the amount of data copyable before the user can react. Further techniques include providing feedback to a user as to what is occurring, such as beeping a simple speaker or flashing a light. Providing accessible auditing of the transactions further improves the security if the device or the resource logs all interactions.

The configuration of the device may provide these options to the configuring user through a user-friendly interface, or the wormhole token may initially have a default security profile that the user can selectively alter. While this discussion occurred here in the process of associating credentials at 62 in FIG. 8, the security considerations may occur at any point in the configuration process, or even before.

Figure 9:
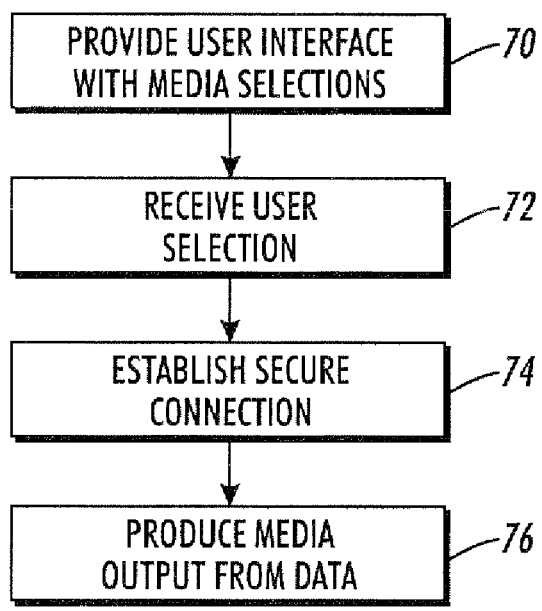
FIG. 9 shows an embodiment of a method of using a wormhole media player.

The configuring user then defines which resources should be accessed based upon which user input at 64. At 66, the connections between the media player and any external device may need configuration. This may include the definition of the interface, as discussed above, to limit accesses of the player by any external devices, such as the legacy stereo or untrusted storage client discussed above. The process may also define the level of authentication also discussed above, such as device only authentication, intermittent user authentication also authenticating the user of the wormhole token, as well as the presence of the token itself, or complete user authentication. Upon completion of the configuration, the use of the wormhole player should provide transparent access to media resources across a network, such as the Internet. FIG. 9 shows an example process of using a wormhole media player.

At 70, the player provides the user a user interface with media selections, similar to what users may see on a local media player, such as an MP3 player or an iPod. The player receives the user selection at 72. Upon reception of the user selection, the player would establish a remote, secure connection at 74. The prior configuration enables this connection to occur transparently to the user. At 76, the player produces the media output, such as a video, music, book, etc., on either the player itself or through a connection to an external device. The external device may be a 'legacy' device such as an analog stereo, television or other display, or any other type of external device such as a digital display, etc.

A wormhole media player constitutes one example of wormhole tokens. Other applications and devices would present different issues. For example, a storage token used by a host as a 'standard' USB (Universal Serial Bus) device, presents a different level of interaction with a host device. This results is a slightly different security profiles and emphasis than a device that may stand alone, such as a wormhole media player.

Figure 10:
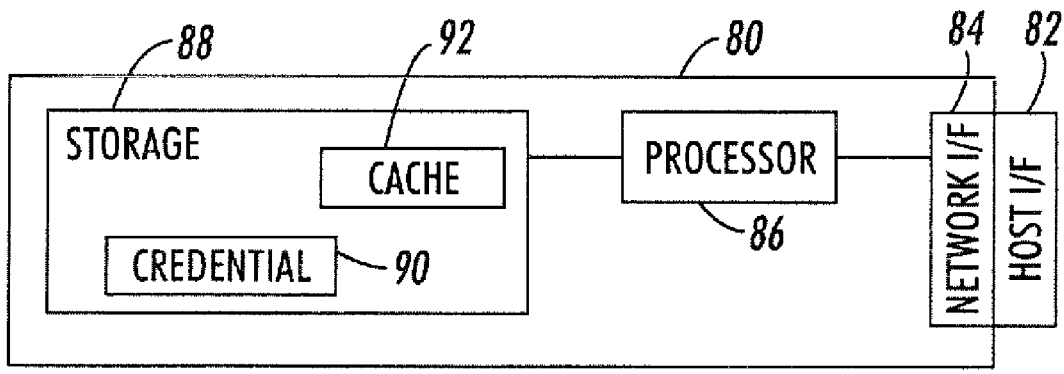
FIG. 10 shows an embodiment of a wormhole storage token.

FIG. 10 shows one example of a wormhole storage token 80. It may take the form of a USB 'thumb' drive, with a USB host interface 82. Designed to interact with a host system, the storage token also has its own processor 86 that may provide additional separation from the host system, as necessary. The wormhole storage token has a network interface 84 that may exist independent of any host network interface, and may allow direct access to secured resources. However, typically the wormhole storage token will utilize the client host network interface to provide network connection.

While referred to as a storage token, the wormhole token may have limited local storage 88 for storage of credentials and processing instructions 90. The wormhole token gathers information as to data stored elsewhere and presents it to the host device and the user as if the data did exist in local storage. Nevertheless, the storage token 80 may have a local cache 92 if so desired.

Figure 11:
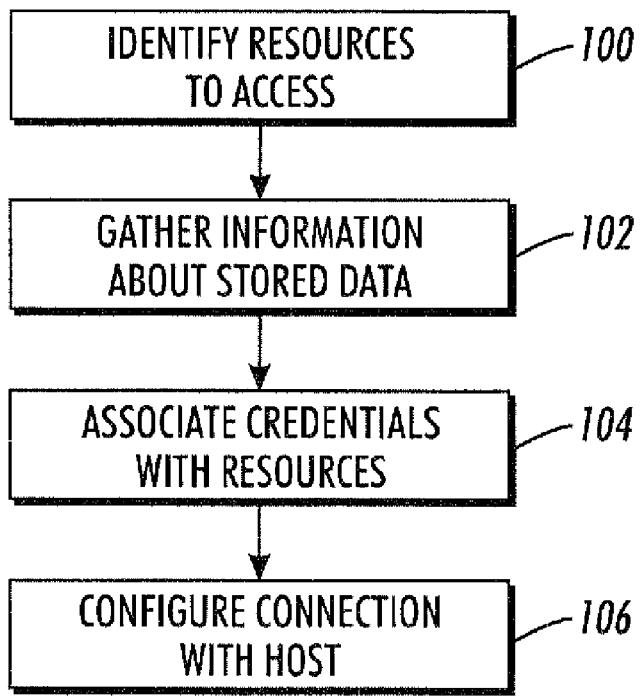
FIG. 11 shows an embodiment of a method of configuring a wormhole storage token.

Since the wormhole storage token provides virtual storage of data available on the network and the data is intended for use by the untrusted client host system, the wormhole storage token may have more vulnerability to attacks from the client host system. The security measures discussed above with regard to untrusted client host attacks may have a higher level of default configuration in order to sufficiently protect the wormhole storage token. The configuration process may need to include a higher level of security associated with either all or particular resources to which the token provides access, or in defense against particular untrusted hosts. For example, access to some or all of the files protected and provided by the wormhole device could require specific forms of authenticating input from the user, such a biometric, PIN, or other input. And some known client hosts could be designated as more trusted than others, and able to access a wider range of data or data with fewer restrictions than otherwise unknown client hosts. FIG. 11 shows example of the configuration process.

At 100, the configuring user identifies resources that the storage token to be enabled to access. At 102, either the storage token, or the configuring user using the storage token, gathers and provides information about the actual stored data on the resources to allow representations of that data to appear when the user 'accesses' the storage token. In one embodiment, the "list" of resources available is actually gathered on the fly over the secure connection back to the trusted host. When the user configures the token, the user tells it a few folders, or hard drives, that it should be able to access. When the user actually accesses the folders or hard drives the server host gives it on the fly the list of files actually and currently in those folders. The configuring user provides the necessary credentials to demonstrate the user's right to access the resources at 104, and the server host and token establish between them, potentially with input from the user, credentials sufficient to allow the token to access the resource in the future, and optionally to allow the token to authenticate the server host to ensure that it is directly and securely accessing the correct resources.

The levels of interaction may vary, but some instances are set out here. First, the user needs to demonstrate that the user has the right to access a resource in order to delegate that right to access in essence to the user's wormhole token. The user will have to authenticate the user to the server host or other entity holding the resource, or provide credentials sufficient for doing so, before the user can configure the delegated access. For example, if the user is giving a storage token the right to read a set of files on a particular computer (the current server host), the user has to first demonstrate the right to access those files, most likely by simply logging into that host. If the user wants to give a media token access to a subscription to some music service, the user has to give the service or the token the password for that service. Then, the server host and the token establish between them a set of credentials, such as cryptographic credentials, sufficient to allow the token to access that resource on the user's behalf in the future.

These credentials may include cryptographic credentials such as public/private key pairs and digital certificates, derived jointly by the token and server host, provided by the server host to the token, or credentials previously possessed by the token and/or server host, such as long-term keys or secrets. At the end of this exchange, the server host or other entity providing access to the configured protected resource must have gathered or generated sufficient credential information to authenticate future requests for that resource by this token. Additionally, the token may have received or generated sufficient information about the server host or resource holder to enable mutual authentication. For example the token may have sufficient information to allow the token to securely authenticate that it is indeed communicating with the correct resource holder in order to access a particular resource, rather than either the wrong resource, or an attacker attempting to interrupt or eavesdrop on said secure access.

As mentioned before, the connection between the wormhole storage token and the host may require tighter control than other applications. The configuration of the connection or relationship between the wormhole storage token and the host provides that control at 106.

In one embodiment, a Gumstix (www.gumstix.com) device may have embedded within it a Linux server with USB and network connectivity. The Linux USB-gadget driver interface (www.linux-usb.org/gadget) makes it relatively easy to create code that will cause such a device to mimic any type of USB device desired. Wired or wireless connectivity to the Gumstix itself provides network connectivity, or the Gumstix uses the host as a network proxy. In the configuration process, the configuring user configures the wormhole storage token with location and access information of the virtual storage locations for which it is supposed to proxy. In this manner, a wormhole storage token may be created.

The wormhole tokens, in whatever form, have the ability to attach to other devices and provide those devices with added functionality. Examples discussed to this point include a media player that can provide media content to devices external to the player, and a storage token that can provide access to stored data across a network. In addition, pairs of wormhole tokens can provide functionality to devices that may not otherwise have certain functions.

For example, using paired wormhole tokens, a first token could connect to a passive, legacy device, such as a printer. The second token may attach to another host that desires to use the printer. Using the previously discussed example of USB tokens, a first USB token connects with a printer. This particular example has the first USB token capable of acting as both a USB host and a USB client. Attached to the printer, it will act as a USB host device, proxying any information it receives from the printer out the wormhole to the other endpoint. For non-USB applications, the first token could be considered a 'peripheral host' as USB, Firewire, secure digital (SD) card and PCI connections are generally for peripheral devices such as printers, memory cards, etc. Another alternative consists of one of the tokens proxying a network for the other, in which case the token may take the form of a box being connected to the network.

The other, second, endpoint acts as a client to the first endpoint. The second endpoint will 'pretend' or emulate to the host to which it connects that it is directly connect to the printer. Neither the printer, nor the host, needs any special-purpose software or drivers. The wormhole tokens do not need special configuration for any pair of devices they connect together. The wormhole tokens simply act to find each other on the network and proxy a connection on behalf of the devices to which they connect.

In order for these tokens to find each other, they must receive configuration instructions to do so. This may occur in several ways. Similar to 'transticks,' an idea developed by Rekimoto and Ayatsuka in their article, "Transticks: Physically Manipulatable Virtual Connections," in *CHI '05. Proceedings of the SIGCHI Conference on Human Factors in Computing Systems*, pp. 251-260, ACM Press, 2005, the wormhole tokens may receive each other's identifier and credentials. When the two tokens find each other, they exchange identifiers and recognize each other.

However, the transticks configuration constitutes only one method of the two paired tokens recognizing each other. Further, the transticks of Rekimoto and Ayatsuka consist of a memory card, with no independent processing capabilities. This implementation requires the transticks to use the untrusted client hosts to which they are connected for all of their computation. The transticks must provide those hosts with their cryptographic authentication keys, and those hosts encrypt and authenticate the data on their behalf. This means that the transticks are not capable of protecting the resources to which they grant access from attack by those untrusted client hosts. The untrusted client hosts gain the ability to access any data made available by the transticks, regardless of the user's wishes, and to access that data at any point in the future, without requiring the transtick to be present, because the host learns the secrets stored by the transtick that grant access to the resource.

Figure 12:
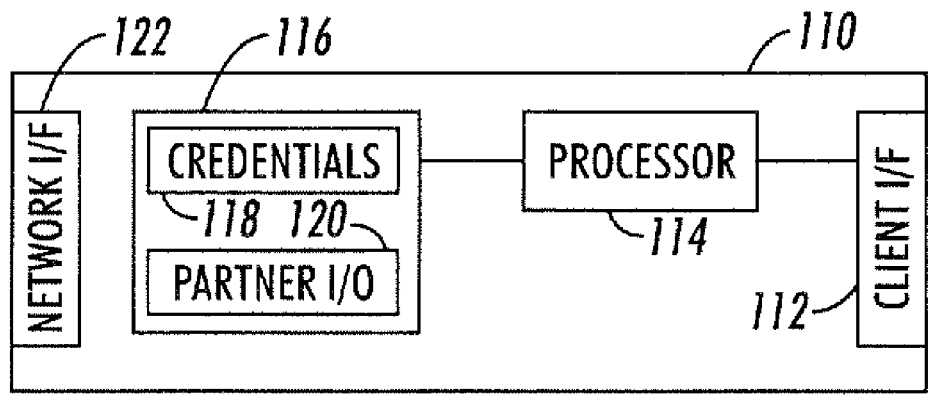
FIG. 12 shows an embodiment of a wormhole token.

The paired wormhole tokens here include a processor, as shown in FIG. 12, which allows them to defend the resources they provide access to from unwanted access by untrusted client hosts, and to ensure that those resources can only be accessed if the wormhole token is both present and, in the case of biometrically-protected wormhole tokens has received necessary authorization from the associated user. Even non-biometrically authenticated tokens could be set up so that the user has to additionally authenticate to the server host, such as by entering a password. Even if this password is entered via the untrusted client, it still enforces the requirement that both the token and the user have to be available. While the password could be stolen, the password itself is not sufficient to access the resource, the token is also needed, and the password could be later changed.

In FIG. 12, the wormhole token 110, one of a pair, has a client interface 112, suitable for interfacing with the client devices, such as the passive, legacy printer discussed above. Examples include USB, IEEE 1394 Firewire, PCI, etc. The token may have its own network connectivity such as 122, or it may use the network connection of the host, through the processor 114. A storage 116 stores the necessary credentials and processing instructions 118 to allow it to communicate with its partner device, and some sort of partner information 120, such as the identifier mentioned above. When two of these tokens, previously paired, connect to other devices and find each other, they create a wormhole between the other devices.

Figure 13:
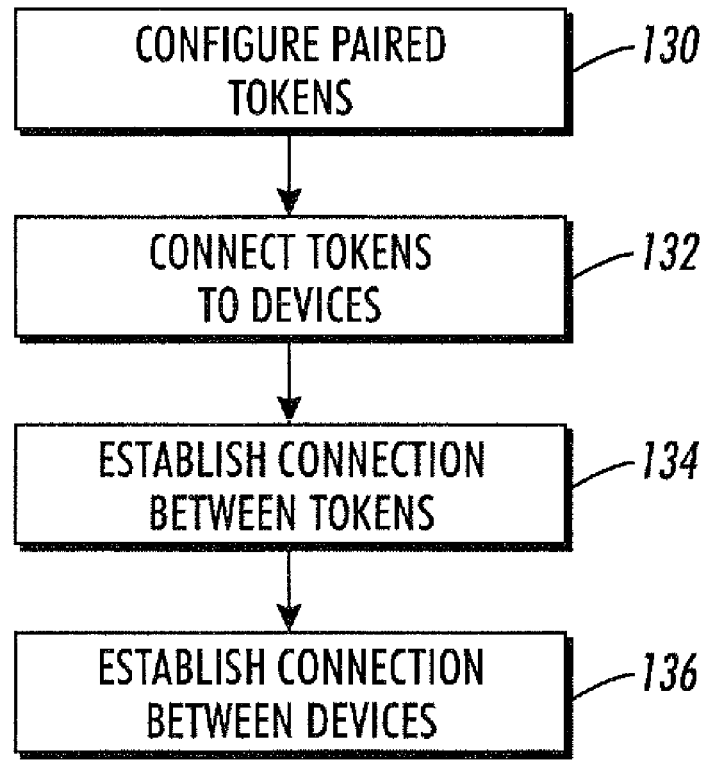
FIG. 13 shows an embodiment of a method of configuring a wormhole wire using paired wormhole tokens.

FIG. 13 shows an embodiment of a method of using the wormhole tokens. The configuration process of 130 may be optional, if the tokens were previously paired prior to this use. The configuration process 130 may constitute a simple exchange of credentials and identification information, as mentioned, above, while the tokens are connected in some fashion, as will be discussed with regard to FIG. 15.

At 132, the first and second tokens become connected to first and second devices for which the tokens will act as proxies to the other device. At 134, the tokens either use their own connection, or the host's connection, to discover each other. One example of discovery occurs when each token broadcasts or multicasts a message looking for the other token's identification. Another example may include use of a directory service, or other public network storage service to allow them to exchange information about their current network location. A further example is the use of mobile IP, or dynamic DNS, to allow them to be addressed at the same network "location" regardless of their actual method of connection to the Internet. Once they locate each other, they set up a communications session. After the tokens establish a communications session, they provide a connection between the first and second devices as if the two devices had a direct connection at 136.

Figure 14:
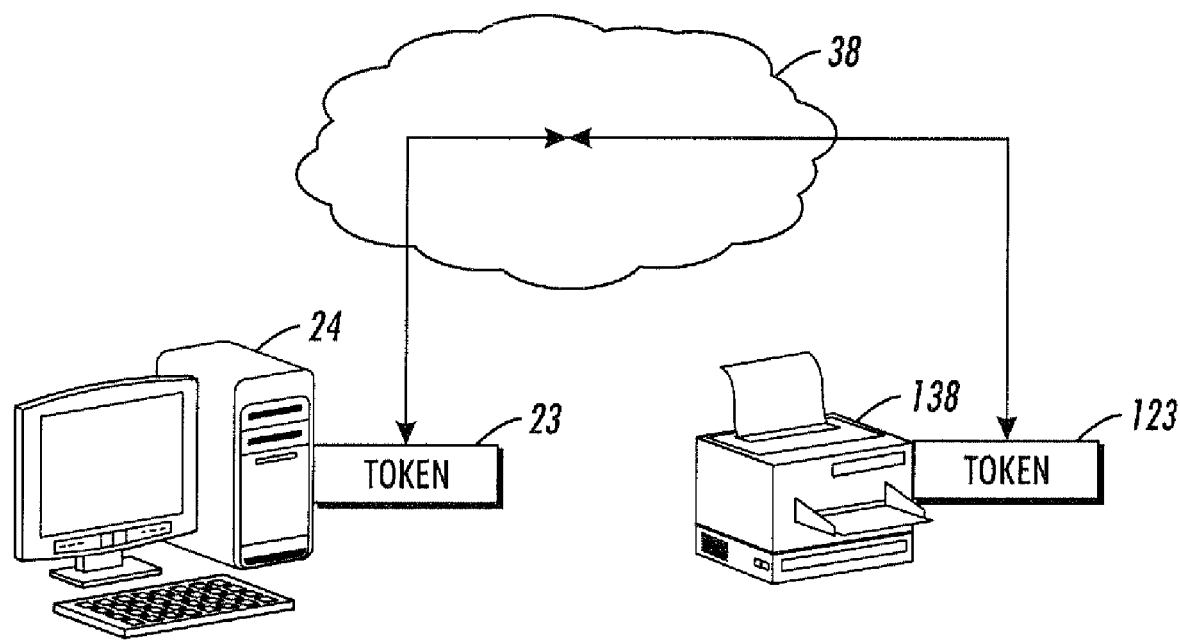
FIG. 14 shows an embodiment of a printer and a computer linked by a wormhole wire.

A specific example may prove helpful, shown in FIG. 14. In FIG. 14, a first wormhole token 23 consists a half of a pair of tokens, with 123 making up the other half. The first token 23 is connected to a server host 24, or could be connected to a client host such as 39 in earlier Figures. The second token 123 is connected to a device 138, in this example a 138. The two tokens, once powered on, find each other and communicate. In this manner, the printer 138 could be accessed by the computer 24 even though the two devices do not necessarily reside on the same network such as 38. The built in security features of these devices, as discussed in detail above, allow the two devices to operate together while protecting each device from any interference or damage from the tokens, or damage to the tokens from the devices.

Other examples of services may include scanning services, where the printer 138 is replaced by or includes a scanner. The device 138 could also be a camera or a microphone to allow the services of video and/or audio monitoring. Similarly, the device 138 may be a display and provides displaying services. Any computer into which the token 23 is plugged could show the output of a particular camera or microphone into which the other token 123 is plugged. The token itself could be a camera, microphone or display as well.

The token may also enable services that are extensions, such as a network extension or a rights extension. In the example of a network extension, the tokens could create a virtual private network for a single device or group of devices, where the group would use bridging or routing services from the device into which the token is directly plugged. Rights extension may take the form of digital rights management (DRM), where the token provides the device to which it is connected to access to DRM protected content.

Figure 15:
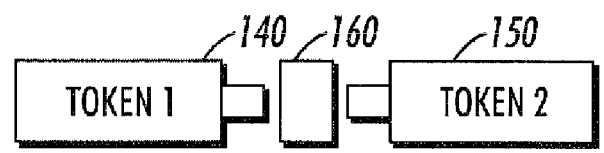
FIG. 15 shows an embodiment of a system to pair wormhole tokens.

From the above discussion, it becomes apparent that the initial configuration must have a user-friendly means to allow the tokens to recognize each other. As at least one of the tokens will generally have a processor, a simple connector may provide the connection between the two tokens, such as a connector having two USB input connectors with a physical connection between them. FIG. 15 shows an example.

A first token 140 has a USB connector and attaches to the connector 160. Token 150 has a similar connector. When connected together, the two tokens exchange information and then provide some sort of completion signal. The completion signal may then also light an LED or make a sound on the connector 160 to notify the user that the exchange has completed.

In another possible embodiment, the connector 160 consists of a computer, such as a PC or even a personal digital assistant (PDA), cell phone, etc. The two tokens connect to the computer and the user directs and confirms the exchange of necessary information between the tokens. However the exchange occurs, once the tokens pair up, they provide an incredible array of functionality to the user and the user's devices. In some embodiments, it may be possible to have paired wormhole tokens and wormhole storage tokens on the same physical wormhole token.

The above examples demonstrate the capabilities provided to the user with wormhole tokens in a robust and secure fashion. By increasing the usability of security, with deployment of the secure wormhole tokens, it becomes much more likely that users will implement the secure procedures and will not bypass or turn off secure measures.

In other embodiments, one or more of the wormhole tokens may consist of software. The software wormhole may comprise a bundle of automated configuration, connectivity and interaction/interface that presents what would normally appear as a complicated set of access steps to a user in a simple, friendly interface. Examples include a specially-crafted or limited uniform resource locator (URL), a bundled combination of credentials, virtual private network (VPN) configurations and software, and specific resource identifiers. To the user these appear as purpose-built applications or interface components, such as a software media player, a folder in a file system, a device connected to a particular wormhole wire endpoint, etc.

It will be appreciated that several of the above-disclosed and other fields and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A token, comprising:
    a memory, including:
        a first set of processing instructions for configuring remote access to a particular remote resource residing upon a computing device on a network the first set of processing instructions containing device configuration information of credentials, a list of identified resources on the device and associated user requests with the resources, and administrative tasks;
        a second set of processing instructions for operating the token in a legacy environment;
        security credentials; and
        resource configuration information for the particular remote resource, wherein each particular remote resource has its own configuration information including intended accesses, authentication measures, and safeguards for the remote resource to maintain;
    an interface through which a connection to a client host is established; and
    a processor:
        in response to user input for configuring a remote access connection with the particular remote resource, executing the first set of processing instructions that include:
            establishing a trusted connection through the interface with the particular remote resource;
            exchanging credentials associated with the particular remote resource over the trusted connection for establishing a secure connection with the particular remote resource over an untrusted connection; and
            defining the resource configuration information for accessing user selected data or services available at the particular remote resource; and
        in response to user input received in a legacy environment, executing the second set of processing instructions that include automatically:
            establishing, over an untrusted connection to the client host available through the interface, a secure connection with the particular remote resource using the security credentials stored in the memory;
            configuring the secure connection for access to the user selected data or services available at the particular remote resource using the configuration information for the particular remote resource stored in the memory;
            making the user selected data or services at the particular remote resource available in the legacy environment; and
            defending against attempted access to data or services available at the token other than the user selected data or services made available in the legacy environment, including attempts by the client host.

2. The token according to claim 1, wherein the legacy environment comprises an computational operating environment with interfaces, protocols, and standards for receiving and processing user input defining one of either a coupling action to establish a connection between the token and the particular remote resource, or an input action at a user interface issuing a command to the legacy environment.

3. The token according to claim 1, wherein the interface of the token is one or a combination of a physical or logical, network interface or device interface.

4. The token according to claim 1, wherein the user input comprises coupling the token with the client host, the legacy environment operates between the token and the client host, and the untrusted connection, over which the secure connection is established, is established through a device interface of the client host.

5. The token according to claim 1, wherein the user input comprises coupling the token with the client host, the legacy environment operates between the token and the client host, and the untrusted connection, over which the secure connection is established, is established through a network interface.

6. The token according to claim 1, wherein the user input comprises an input action at a user interface of the token that issues a command, the legacy environment operates between the token and the client host, and the untrusted connection, over which the secure connection is established, is established through a network interface.

7. The token according to claim 1, wherein the user input comprises coupling the token with the client host, the legacy environment operates between the token and the client host; and the untrusted connection, over which the secure connection is established, is established through a device interface of the client host.

8. The token of claim 1, the interface further comprising one of a wireless interface in accordance with IEEE 802.11x, a Bluetooth interface, an infrared interface, an interface in accordance with IEEE 1394, a wide-area or metropolitan-area wireless interface such as one in accordance with IEEE 802.16, an Ethernet interface, and a local area network interface.

9. The token of claim 1, the security credentials further comprising one of public keys, public-key certificates, cryptographic hashes of public keys, cryptographic hashes of public-key certificates, private keys, tokens, secrets or passwords, symmetric cryptographic keys, cryptographic hashes of tokens, anonymous or privacy-preserving cryptographic credentials, and Kerberos or other cryptographic "tickets".

10. The token of claim 1, the token further comprising a biometric identifier.

11. The token of claim 1, the token comprising one of a pair of wormhole tokens for a wormhole wire.

12. The token of claim 11, wherein one of the pair of wormhole tokens is connected to a computer and another of the pair of wormhole tokens is connected to a printer, camera, or other legacy device.

13. The token of claim 1, the token further comprising a media player and the legacy environment includes at least one legacy device.

14. The token of claim 13, the legacy device comprising one of a stereo, an internal speaker, an internal display, an external display, a television, an external speaker, at least one headphone or a personal computer.

15. The token of claim 1, the token further comprising a storage token.

16. The token of claim 15, the processor further to encrypt the memory on the storage token when the storage token is not active.

17. The token of claim 15, the first set of processing instructions further to limit access to the storage token by a host.

18. The token of claim 1, wherein the processor in executing the second set of processing instructions automatically:
discovers a partner token using security credentials and a partner token identifier stored in the memory;
establishes a secure connection to the partner token; and
proxies the user selected data or service available at the server host through the secure connection to the partner token.

19. The token of claim 18, wherein the service is printing.

20. A method, comprising:
receiving a user input at a token attached to a client host;
if the user input is an input for configuring a remote access connection with a particular remote resource residing upon a computing device on a network:
establishing a trusted connection through an interface with the particular remote resource;
exchanging credentials over the trusted connection for establishing a secure connection with the particular remote resource over an untrusted connection; and
defining resource configuration information for accessing user selected data or services available at the particular remote resource, wherein the resource configuration information comprises intended accesses, authentication measures, and safeguards for the remote resource to maintain; and
if the user input is received in a legacy environment:
establishing, over an untrusted connection with the client host available through the interface, a secure connection with the particular remote resource using security credentials stored in a memory;
configuring the secure connection for access to the user selected data or services available at the particular remote resource using resource configuration information stored in the memory, wherein each particular remote resource has a configuration for that particular remote resource including intended accesses, authentication measures, and safeguards for the remote resource to maintain;
making the user selected data or services at the particular remote resource available in the legacy environment; and
defending against attempted access to data or services available at the token other than the user selected data or services made available in the legacy environment, including attempts by the client host.

21. The method according to claim 20, wherein the user input comprises coupling the token with the client host and establishing the untrusted connection occurs through a device interface of the client host.

22. The method according to claim 20, wherein the user input comprises coupling the token with the client host and establishing the untrusted connection occurs through a network interface.

23. The method according to claim 20, wherein receiving the user input comprises receiving an input action at a user interface of the token that issues a command, and establishing the untrusted connection occurs through a network interface.

24. The method according to claim 20, wherein the user input comprises coupling the token with the client host and establishing the untrusted connection occurs through a device interface of the client host.

25. The method according to claim 20, further comprising discovering a partner token using security credentials and a partner token identifier stored in the memory;
establishing a secure connection to the partner token; and
proxying the user selected data or service available at the remote resource through the secure connection to the partner token.

* * * * *

UNITED STATES PATENT AND TRADEMARK OFFICE
CERTIFICATE OF CORRECTION

PATENT NO. : 8,387,124 B2  
APPLICATION NO. : 11/744451  
DATED : February 26, 2013  
INVENTOR(S) : Diana K. Smetters, Trevor F. Smith and Kyung-Hee Lee Page 1 of 1

It is certified that error appears in the above-identified patent and that said Letters Patent is hereby corrected as shown below:

On the title page, (73) Assignee: should read as follows:

Palo Alto Research Center Incorporated, Palo Alto, CA (US) and Samsung Electronics Co., Ltd. Republic of Korea (KR)

Signed and Sealed this  
Fourth Day of March, 2014

Michelle K. Lee  
*Deputy Director of the United States Patent and Trademark Office*